April 19, 1966 HIDEHISA HONDA ETAL 3,246,704
DEVICE FOR TILLING BENEATH THE TRANSMISSION
CASING OF A ROTARY CULTIVATOR
Filed Dec. 20, 1963
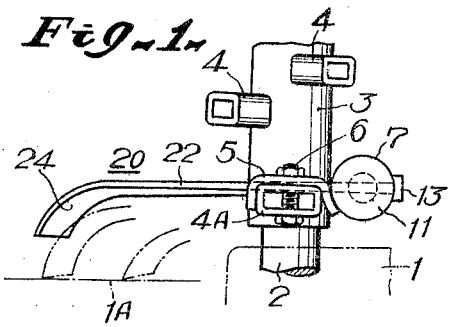
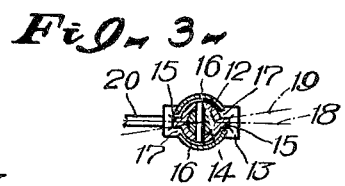
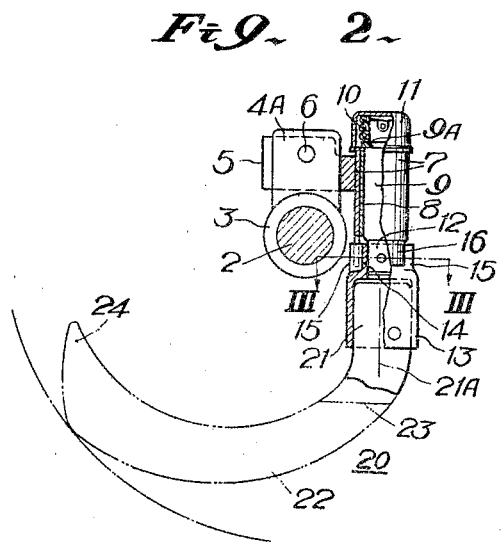
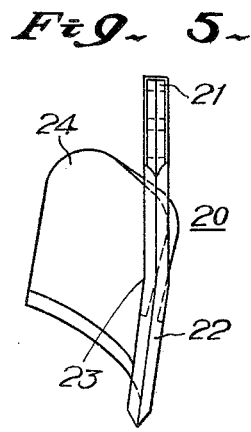
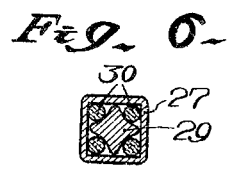
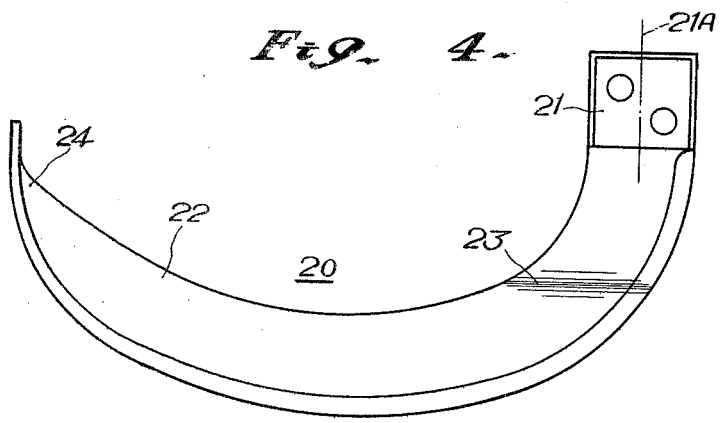
INVENTORS:
HIDEHISA HONDA
JUN SAKAI
BY E. M. Squire
ATTORNEY.

United States Patent Office 3,246,704
Patented Apr. 19, 1966

3,246,704
DEVICE FOR TILLING BENEATH THE TRANSMISSION CASING OF A ROTARY CULTIVATOR
Hidehisa Honda and Jun Sakai, Kita-Adachi-gun, Saitama-ken, Japan, assignors to Kabushikikaisha Honda Gijutsu Kenkyujo, Saitama-ken, Japan, a corporation of Japan
Filed Dec. 20, 1963, Ser. No. 332,143
Claims priority, application Japan, June 24, 1963,
38/45,515
5 Claims. (Cl. 172—96)

This invention relates to rotary cultivators and particularly to those of the type including a transmission casing and a rotary shaft extending laterally therefrom.

With rotary cultivators, it is well known that the tilling efficiency of the cultivator can be materially improved by use of additional rotary blades secured to the cultivator shaft and each having an elongated body portion extending sidewise from the base end of the blade.

The present invention is intended to provide an improved rotary cultivator of the type described which includes at least one rotary blade of the type described above and is capable of effectively tilling the strip of soil being cultivated which is located directly beneath the transmission casing of the cultivator during its operation and which was previously left untilled by conventional cultivators.

According to one feature of the present invention, there is provided a rotary cultivator of the type described having a device for tilling beneath the transmission casing and comprising at least one pivot shaft mounted on the rotary shaft of the cultivator adjacent to the transmission casing and a rotary blade including a cylindrical base portion secured to said shaft for pivotal movement about an axis spaced from and effectively perpendicular to the rotational axis of the cultivator shaft. The blade comprises an elongated body portion extending outwardly from said base portion, said base portion having a longitudinal axis extending in the same direction as that of said pivot shaft or at a small angle with respect thereto.

According to another feature of the present invention, the operative free end portion of the rotary blade is curved so that it is urged toward the medial plane of the transmission casing under the reaction caused by the drag of the soil acting on said rotary blade when it is moved through the soil.

The present invention will now be described in further detail with reference to the accompanying drawings, which illustrate a preferred embodiment of the invention and in which:

FIG. 1 is a fragmentary diagrammatic plan view of an embodiment of the invention showing the essential parts thereof;

FIG. 2 is a vertical cross-sectional view of same taken at right angles to the view of FIG. 1;

FIG. 3 is a cross-sectional view taken along the line III—III in FIG. 2;

FIG. 4 is an enlarged side elevation of the rotary blade shown in FIG. 2;

FIG. 5 is a front elevation of same;

FIG. 6 is a transverse cross-sectional view of a modification of the pivot shaft shown in FIG. 3.

Referring to the drawings and first to FIGS. 1 to 3, the cultivator has a transmission casing 1 and a rotary cultivator shaft 2 extending laterally from the transmission casing transversely of the direction of travel of the cultivator and above the ground being cultivated. A sleeve 3 is fitted fast on the rotary shaft 2 and formed on its periphery with a number of sockets 4, 4 and 4A for cultivator blades. A support plate 5, which is U-shaped in cross section, is fitted on the one of the lugs 4A which is closest to the transmission casing 1, being detachably secured to the lug 4A by means of a bolt 6 and a nut. A bearing sleeve 7 is secured to one end of the support plate 5 with its axis spaced from and at right angles to the axis of the cultivator shaft 2. A pivot shaft 9 is journaled in said sleeve 7 by means of a bearing element 8 interposed therebetween. A helical tension spring 10 in anchored at opposite ends to the bearing sleeve 7 and the adjacent end of the shaft 9, respectively. A cap 11 is threadedly fitted over the bearing sleeve 7, and a snap type retaining ring 9A is fitted in an annular groove formed in the shaft 9 to retain the shaft 9 within sleeve 7. The pivot shaft 9 has a reduced-diameter bottom end portion 12 as shown in FIG. 2. A tubular blade holder 13 has an annular top 14 tightly fitted over the reduced-diameter bottom portion 12 of the shaft 9 and diametrically opposed lugs 15 are formed on the annular top 14 for limiting the extent of the pivotal movement of shaft 9. The bottom portion of the bearing sleeve 7 is formed with diametrally opposite slots 17 extending axially from the bottom edge thereof to loosely receive the respective rotation-restraining lugs 15 on the top of the tubular blade holder 13. The slots 17 and lugs 15 are dimensioned to permit pivotal movement of the blade holder 13 within an angular range as defined by the dotted lines 18 and 19 in FIG. 3.

A rotary tilling or cultivator blade 20 has a base portion 21 firmly fitted in the tubular blade holder 13. As clearly shown in FIGS. 4 and 5, the rotary blade 20 has an elongated body portion 22 extending sidewise from the base portion 21 of the blade. The blade body portion 22 is bent along line 23 toward the medial plane 1A of the transmission casing 1 and has a free end throwing tip portion 24 curved toward the pivot shaft 9.

One important feature of the present invention lies in the fact that the base portion 21 of the rotary blade 20, which is secured to the pivot shaft 9 extends at right angles to the cultivator shaft 2, has an axis 21A extending in the same direction as that of the shaft 9 or at a relatively limited angle thereto the axis of shaft 9 and axis 21A both being spaced from and effectively perpendicular to the rotational axis of the cultivator shaft 2. The rotary blade 20 has an elongated body portion 22 extending transversely of cultivator shaft 2 from the base portion 21 of the blade, as described above. According to this feature, the tip portion 24 of the blade body 22 is substantially spaced from the axis of the pivot shaft 9. For this reason, it will be recognized that, if the rotary blade 20 is only slightly rotated with the rockable shaft 9 about its axis by suitable means, such as will be described hereinafter, the tip portion of the rotary blade 20 when driven into the soil or its surface, will be displaced inwardly by a substantial distance to reach a point close to the medial plane 1A of the transmission casing 1 of the cultivator, as indicated by the phantom lines in FIG. 1, and, cooperating with the intermediate portion of the blade, effectively till the untilled strip of soil extending directly beneath the transmission casing 1. In the event that the tip portion of the blade includes a throwing tip formation 24 as described above, it will be apparent that such formation is spaced a substantial distance from the axis of the pivot shaft 9 and is thus effective to work on the otherwise untilled strip.

The pivotal movement of the rotary blade 20 described above can be effected positively by a mechanism such as shown in FIG. 7 or automatically by the arrangement of FIGS. 1 to 5 inclusive. In this arrangement, since the outside edge of the body portion 22 of the blade is bent as shown in FIG. 5, the blade body portion is forced toward the casing 1 under the drag of the soil through which the blade proceeds so that the tip or throwing portion 24 of the blade 20 is automatically swung in a direction to approach the medial plane 1A of the transmission casing against the resilience of the coiled spring 10. Subsequently, when the rotary blade 20 is moved clear of the soil, it is restored to its normal position as indicated by the solid lines in FIG. 1 under the bias of the spring 10. Thus, the rotary blade 20 is effectively caused to clear the transmission casing 1 during its movement above the ground.

The same effect can also be obtained by replacing the coil spring 10, for example, by rubber or like elastic pieces 30 shown in FIG. 6. In this modification, the bearing sleeve 7 takes the form of a socket 27 of square cross section and the pivot shaft 9 has a more or less cruciform cross section as indicated at 29 with the elastic pieces 30 filled in the four corner spaces between the walls of the socket 27 and the pivot shaft fitted therein.

While we have shown and described what we believe to be the best embodiments of our invention, it will be apparent to those skilled in the art that various changes and modifications may be made therein without departing from the spirit and scope of the invention as defined in the appended claims.

What is claimed is:

1. Cultivator apparatus of the class described, comprising: an elongated cultivator shaft for supporting cultivator blades, said shaft extending transversely of the direction of travel of the cultivator and above the ground being cultivated; a transmission for driving said shaft in rotation about its longitudinal axis during said travel of said cultivator, said transmission including a casing surrounding and enclosing laterally spaced portions of said shaft; a blade support member mounted on said shaft for rotation therewith adjacent to said casing; a cultivator blade having a free end portion engageable with the ground being cultivated, the other end portion being connected to said support member for pivotal movement about an axis spaced from and effectively perpendicular to the rotational axis of said shaft, said free end portion, in its entirety, being spaced radially outwardly from said axis of pivotal movement throughout the entire range of said pivotal movement; resilient means yieldingly urging said blade to a position wherein clearance is provided between said blade and said transmission; and stop means limiting said pivotal movement to a predetermined range of angular displacement, said free end portion being positioned directly beneath said transmission while said cultivator blade is in engagement with said ground by the force resulting from said engagement and away from said transmission by said resilient means to clear said casing during movement of said free end portion above the ground.

2. Cultivator apparatus of the class described comprising: an elongated cultivator shaft for supporting cultivator blades, said shaft extending transversely of the direction of travel of the cultivator and above the ground being cultivated; a transmission for driving said shaft in rotation about its longitudinal axis during said travel of said cultivator, said transmission including a casing surrounding and enclosing laterally spaced portions of said shaft; a blade support member mounted on said shaft for rotation therewith adjacent to said casing; a cultivator blade having a free end portion engageable with the ground being cultivated, the other end portion being connected to said support member for free pivotal movement about an axis spaced from and effectively perpendicular to the rotational axis of said shaft, said free end portion, in its entirety, being spaced radially outwardly from said axis of pivotal movement throughout the entire range of said pivotal movement, said free end portion being curved to urge said free end portion toward a position directly beneath said transmission by moving engagement between said free end portion and said ground; stop means for limiting the range of said pivotal movement; and resilient means carried by said support member and acting on said blade and yieldingly urging said free end portion away from said transmission to clear said casing during movement of said free end portion above the ground.

3. Cultivator apparatus of the class described, comprising: an elongated cultivator shaft for supporting cultivator blades, said shaft extending transversely of the direction of travel of the cultivator and above the ground being cultivated; a transmission for driving said shaft in rotation about its longitudinal axis during said travel of said cultivator, said transmission including a casing surrounding and enclosing central laterally spaced portions of said shaft; a blade support member fixedly mounted on said shaft for rotation therewith immediately adjacent to said casing; an elongated cultivator blade having a central portion extending transversely of said shaft and including a free end portion engageable with the ground being cultivated, the other end portion being connected to said support member for pivotal movement about an axis spaced from and effectively perpendicular to the rotational axis of said shaft; stop means carried by said support member for limiting the angular range of said pivotal movement; and resilient means carried by said support member and acting on said blade for selectively urging said free end portion directly beneath said transmission while said cultivator blade is in engagement with said ground and away from said transmission to clear said casing during movement of said free end portion above the ground.

4. Cultivator apparatus of the class described, comprising: an elongated power operated rotatable cultivator shaft comprising means for supporting tilling blades for rotation therewith, said shaft extending transversely of the direction of travel of the cultivator and above the ground being cultivated; a transmission for driving said shaft during said travel of said cultivator, said transmission including a casing surrounding and enclosing axially spaced portions of said shaft; a blade support member mounted on said shaft for rotation therewith adjacent to said casing; an elongated tilling blade having a central body portion spaced from and extending transversely across said shaft and including a curved free end portion engageable with the ground being cultivated, the other end portion being connected to said support member for pivotal movement about an axis spaced from and effectively perpendicular to the rotational axis of said shaft, said free end portion, in its entirety, being spaced radially outwardly from said axis of pivotal movement throughout the entire range of said pivotal movement; stop means for limiting the range of said pivotal movement; and means including the curved configuration of said free end portion of said blade and resilient means for selectively urging said free end portion beneath the medial plane of said transmission while said tilling blade is in engagement with said ground and away from said medial plane to clear said casing during movement of said free end portion above the ground.

5. A cultivator according to claim 4, wherein said other end portion of said tilling blade is connected to said blade support member by means comprising a pivot shaft of non-circular cross-section laterally enclosed within a member having an aperture of non-circular cross-section defining at least one space between said pivot shaft and said aperture the cross-sectional area of which, in a plane normal to the pivotal axis of said pivot shaft, varies in response to pivotal movement of said pivot shaft; and in which said resilient means yieldingly urges said free end portion of said tilling blade away from said medial plane and comprises resilient material confined within said space.

(References on following page)

References Cited by the Examiner

UNITED STATES PATENTS

| | | | |
|---|---|---|---|
| 2,214,702 | 9/1940 | Seaman | 172—96 XR |
| 3,012,616 | 12/1961 | Horowitz | 172—95 XR |
| 3,087,555 | 4/1963 | Lester | 172—546 XR |
| 3,120,279 | 2/1964 | Horowitz | 172—95 |

FOREIGN PATENTS

| | | |
|---|---|---|
| 422,013 | 6/1947 | Italy. |
| 568,555 | 11/1957 | Italy. |
| 589,941 | 3/1959 | Italy. |

ABRAHAM G. STONE, *Primary Examiner.*

T. GRAHAM CRAVER, *Examiner.*